(12) United States Patent
Ashton et al.

(10) Patent No.: US 7,085,151 B2
(45) Date of Patent: Aug. 1, 2006

(54) STORAGE DEVICE HAVING A RESISTANCE MEASUREMENT SYSTEM

(75) Inventors: Gary Ray Ashton, Eagle, ID (US); Robert Newton Bicknell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 275 days.

(21) Appl. No.: 10/756,549

(22) Filed: Jan. 13, 2004

(65) Prior Publication Data

US 2005/0152175 A1   Jul. 14, 2005

(51) Int. Cl.
*G11C 11/00* (2006.01)
(52) U.S. Cl. ............ 365/148; 365/217; 365/237
(58) Field of Classification Search ............ 365/148, 365/155, 128, 151, 217, 237
See application file for complete search history.

(56) References Cited

U.S. PATENT DOCUMENTS

| | | |
|---|---|---|
| 4,583,128 A | 4/1986 | Anderson, Jr. et al. |
| 5,124,183 A | 6/1992 | Nakano et al. |
| 5,557,596 A | 9/1996 | Gibson et al. |
| 5,940,106 A | 8/1999 | Walker |
| 6,087,674 A | 7/2000 | Ovshinsky et al. |
| 6,473,388 B1 * | 10/2002 | Gibson .................. 369/126 |
| 2003/0086352 A1 * | 5/2003 | Raese ................... 369/101 |
| 2003/0206512 A1 * | 11/2003 | Ashton .................. 369/101 |
| 2005/0086471 A1 * | 4/2005 | Spencer ................. 713/165 |

OTHER PUBLICATIONS

D.B. Holt, "The Remote Electron Beam-Induced Current Analysis of Grain Boundaries in Semiconducting and Semi-Insulating Materials," Accepted Oct. 1, 1999, pp. 1-24.

* cited by examiner

*Primary Examiner*—Richard Elms
*Assistant Examiner*—Hien N Nguyen

(57) ABSTRACT

A storage device and a storage system employing the storage device. In one embodiment, the storage device comprises an electron emitter and a storage medium comprising an information layer having at least a first state and a second state for storing information. The storage device comprises a resistance measurement system coupled to the storage medium for reading the information stored at the information layer by measuring resistance to determine a state of a storage area on the information layer.

21 Claims, 6 Drawing Sheets

STORAGE DEVICE HAVING A RESISTANCE MEASUREMENT SYSTEM

BACKGROUND OF THE INVENTION

Researchers have worked for years to increase the storage density and reduce the cost per bit of computer system storage devices. These efforts have met with some success, as storage density has increased and cost per bit has dropped in conventional storage devices, such as magnetic hard-drives, optical drives and dynamic random access memory (DRAM). However, it has become increasingly difficult to put more information into storage devices using conventional technologies, which may be approaching fundamental limits.

Scientists have proposed alternative approaches in an attempt to increase storage density and reduce cost per bit. In one approach, referred to as Scanned Probe Microscopy (SPM), a probe is positioned extremely close to a storage medium. In one configuration, referred to as Scanning Tunneling Microscopy (STM), the probe is positioned within a few nanometers of the storage medium. Positioning the probe close to the storage medium ensures the probe is within tunneling range of the medium. However, precisely controlling the spacing between the probe and storage medium is a difficult and expensive task. In another configuration, referred to as Atomic Force Microscopy (AFM), the probe actually touches the medium. In each of these configurations, it is difficult and expensive to build a storage system where the storage medium and/or probe are not eventually damaged.

Some researchers have tried approaches that eliminate the need for extremely close proximity or contact between the probe and storage medium. Some approaches are based on non-contact Scanning Force Microscopy (SFM), which typically suffers from poor resolution and poor signal to noise ratio. Another approach is based on Near-Field Scanning Optical Microscopy, which has limited lateral resolution and slow access times. The utility of the storage device is limited if it takes a long time to retrieve stored information. High storage density, low cost per bit and fast access times are needed in a computer system storage device.

In one embodiment, the storage medium is a heterojunction diode including a phase change material for information storage. Field emitters write information into a storage area of the storage medium by emitting an electron beam into the phase change material. The magnitude of the electron beam is increased and decreased to change the state of the storage area on which it impinges. Information is read from the storage device by bombarding a storage area with an electron beam to generate a signal current from the storage area. The magnitude of the signal current depends on the state of the storage area. The information stored in the storage area (i.e., the state of the storage area) can be determined from the magnitude of the signal current collected through the storage medium.

SUMMARY

Embodiments of the present invention provide a storage device and a storage system employing the storage device. In one embodiment, the storage device comprises an electron emitter and a storage medium comprising an information layer having at least a first state and a second state for storing information. The storage device comprises a resistance measurement system coupled to the storage medium for reading the information stored at the information layer by measuring resistance to determine a state of a storage area on the information layer.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
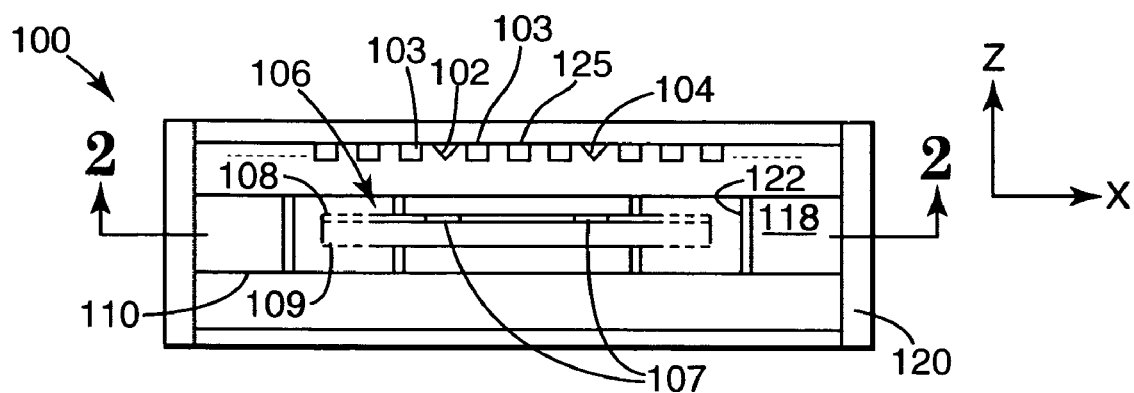
FIG. 1 is a cross-section view illustrating one exemplary embodiment of a storage device according to the present invention having a resistance measurement system.

FIG. 1 is a side cross-sectional view illustrating one exemplary embodiment of a storage device 100, such as an atomic resolution storage device, according to the present invention. The storage device 100 includes a storage medium having an information layer and a semiconductor layer, the information layer having a first state or a second state for storing information at a storage area or location. During a read operation, an electron emitter provides an electron beam to the storage location and an electron beam induced current passes through the storage medium. The device includes a resistance measurement system for detecting the resistance of the storage medium at the storage location using the electron beam-induced current for determining the state of the storage medium at the storage area or location.

Atomic resolution storage device 100 includes a nonvolatile memory component employing a plurality of electron emitters, one or more storage medium surfaces and at least one micromover. In one embodiment, each electron emitter is positioned near an associated partitioned area on the medium surface. The corresponding micromover enables movement of the electron emitter relative to the medium surface to aid in the redundant reading and writing of data at multiple partitioned areas on the medium surface. In one embodiment, the micromover is attached to the corresponding partitioned area of the medium and the corresponding electron emitter is held stationary, for movement of the medium relative to the electron emitter. In another embodiment, the micromover is coupled to an electron emitter and the corresponding medium is held stationary.

Each atomic resolution storage device used in the present invention may be small in size, have low power requirements, and provide for nonvolatile, high density storage of data. The term "atomic resolution storage device" as used herein, is defined as a nonvolatile memory storage device or component capable of storing a large volume of data, such as megabytes to gigabytes of data points, within a relatively small storage area and requiring very low power consumption. The storage device includes a plurality of emitters, a storage medium and a micromover for moving the emitters relative to the storage medium to store information on the storage medium.

In FIG. 1, storage device 100 includes a number of electron emitters, such as electron emitters 102 and 104, storage medium 106 including a number of storage areas, such as storage area 107, and micromover 110. Micromover 110 scans storage medium 106 with respect to the electron emitters or vice versa. In one embodiment, each storage area is responsible for storing one bit of information. Storage medium 106 includes an information layer 108 and a semiconductor layer 109. Information layer 108 has a first state or a second state for storing information (e.g., data) at each storage area. In one embodiment, information layer 108 is made of a phase change semiconductor material. In one embodiment, the phase change semiconductor material is a Ge—Sb—Te ternary alloy.

A resistance measurement system is coupled to the storage medium for reading the information stored on the information layer by detecting resistance using an electron beam current to determine whether a storage area in the information layer is in the first state or the second state. A detailed discussion of one exemplary embodiment of a resistance measurement system used in storage device 100 is disclosed in this application. A storage device without a resistance measurement system for reading data is described in the Gibson et al. U.S. Pat. No. 5,557,596, which is herein incorporated by reference.

In one embodiment, electron emitters 102 and 104 are point emitters having relatively sharp points. Alternatively, other electron emitters can be used (e.g., flat or planar electron emitters).

During operation, a pre-selected potential difference is applied between an electron emitter and its corresponding gate, such as between electron emitter 102 and gate 103. Due to the sharp point of the emitter, an electron beam current is projected from the emitter towards the storage area. Depending on the distance between the emitters and the storage medium 106, the type of emitters, and the spot size (bit size) required, electron optics can be utilized to focus the electron beams. A voltage can also be applied to the storage medium 106 to either accelerate or decelerate the field-emitted electrons or to aid in focusing the field-emitted electrons.

In one embodiment, each electron emitter has a corresponding storage area. In another embodiment, each electron emitter is responsible for a number of storage areas. As micromover 110 moves storage medium 106 to different locations, each emitter is positioned above different storage areas. With micromover 110, an array of electron emitters can scan over storage medium 106.

Micromover 110 can take many forms, as long as it has sufficient range and resolution to position the electron emitters over the storage areas. In one embodiment, micromover 110 is fabricated by a standard semiconductor microfabrication process to scan storage medium 106 in the X and Y directions with respect to casing 120.

The electron emitters read and write information on the storage areas using the electron beams they produce. The electron emitters produce electron beams that are narrow enough to achieve the desired bit density on the storage medium and the power density needed for reading from and writing to the storage medium.

Figure 2:
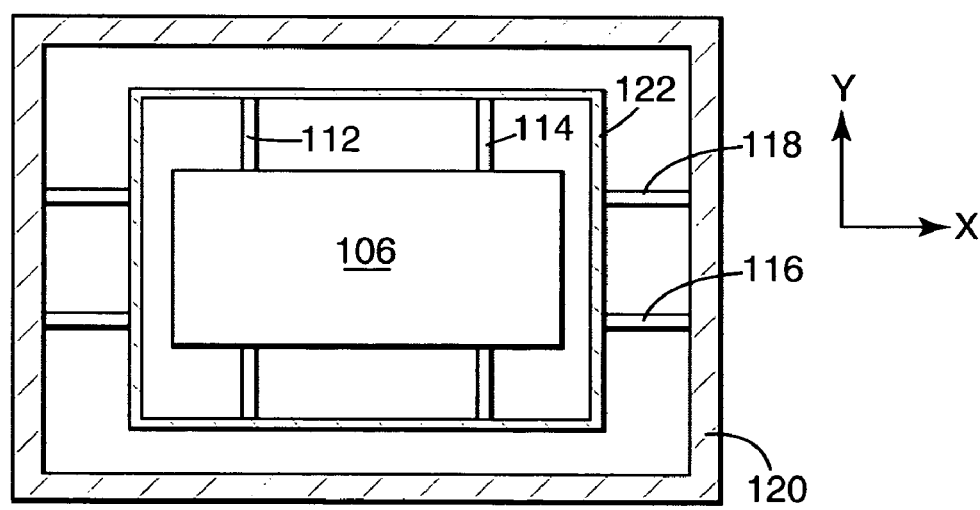
FIG. 2 is a top cross-sectional view of the storage device of FIG. 1 taken along lines 2—2.

FIG. 2 shows the top view of the cross section 2—2 in FIG. 1, illustrating storage medium 106 held by two sets of thin-walled microfabricated beams. The faces of the first set of thin-walled beams are in the Y-Z plane, such as 112 and 114. Thin-walled beams 112 and 114 can be flexed in the X direction allowing storage medium 106 to move in the X direction with respect to casing 120. The faces of the second set of thin-walled beams are in the X-Z plane, such as 116 and 118. Thin-walled beams 116 and 118 allow storage medium 106 to move in the Y direction with respect to casing 120. Storage medium 106 is held by the first set of beams, which are connected to frame 122. Frame 122 is held by the second set of beams, which are connected to casing 120. The electron emitters scan over storage medium 106, or storage medium 106 scans over the field emitters, in the X-Y directions by electrostatic, electromagnetic, piezoelectric, or other suitable means. In this embodiment, micromover 110 moves storage medium 106 relative to the electron emitters.

Figure 3:
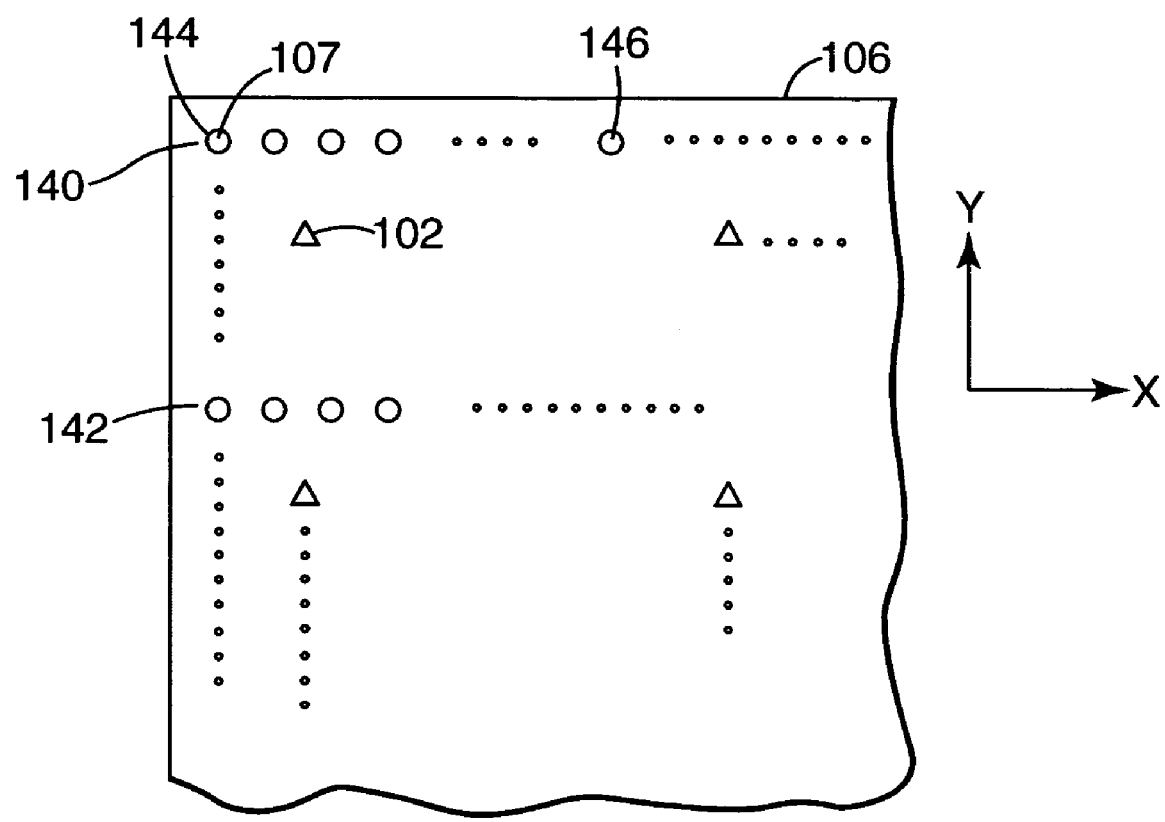
FIG. 3 is a top view illustrating one exemplary embodiment of a portion of the storage medium of the storage device of FIG. 1.

FIG. 3 is a top view illustrating one exemplary embodiment of a portion of storage medium 106 having a two-dimensional array of storage areas and a two-dimensional array of emitters. The storage areas are accessed using external circuits. In one embodiment, to reduce the number of external circuits, storage medium 106 is separated into rows, such as rows 140 and 142, where each row contains a number of storage areas. Each emitter is associated with a number of rows or partial rows. For example, emitter 102 is associated with the storage areas within rows 140 through 142, and within columns 144 through 146. All rows of storage areas accessed by one emitter are connected to one external circuit. The emitter responsible for a storage area is activated and micromover 110 (shown in FIG. 1) moves that emitter to that storage area to access the storage area. The external circuit connected to the rows of storage areas within which that storage area lies is also activated.

In one method, writing is accomplished by temporarily increasing the power density of the electron beam current to modify the surface state of the storage area. Reading is accomplished by measuring the resistance along a path defined between the electron emitter and storage medium ground, using an electron beam current through the storage medium (or corresponding current or voltage) including the storage area along the read signal path. The detected resistance is used to determine whether a storage area is in a first state (e.g., an unmodified state) or a second state (e.g., a modified state). For example, a storage area that has been modified can represent a logic high "1" bit, and a storage area that has not been modified can represent a logic low "0" bit, and vice versa. The storage area can also be modified to represent more than two bits. Some modifications may be permanent, and some modifications may be reversible. The permanently modified storage medium is suitable for write-once-read-many memory (WORM).

Storage medium 106 is made of the information layer 108 and the semiconductor layer 109. Information layer 108 has a first state and a second state for storing information. In one embodiment, storage medium 106 is made of a phase change material. During a write operation, the structure of a storage area is altered in such a way as to vary its material properties. Reading is accomplished by using the resistance measurement system to detect the resistance signal as a lower power density electron beam is applied to storage medium 106. During reading, the power density of the electron beam is kept low enough so that no further writing occurs. The detected resistance corresponds to whether a storage area is in a first state or a second state.

One embodiment of storage medium 106 includes a material whose structural state can be changed from crystalline to amorphous or from amorphous to crystalline by electron beams. The amorphous state has different material properties than the crystalline state that lead to a different resistance signal being detected via the resistance measurement system as the low power density electron beam is applied to the storage area. By measuring the resistance, the state of the storage area can be determined. To change the material from the amorphous state to the crystalline state, the electron beam power density is first increased and then slowly decreased. This process heats the amorphous material and then slowly cools it so that the area has time to anneal into its crystalline state. To change the material from the crystalline state to the amorphous state, the beam power density is increased to a high level and then rapidly decreased. To read from the storage medium, a lower-energy beam is focused on a desired storage area. In one aspect, phase change material in an amorphous state is more resistive than phase change material in a crystalline state.

Other methods can also be used to induce a state change in storage medium 106. For example, a change in the topography of storage medium 106, such as a hole or bump, will modify the resistance of storage medium 106. This modification occurs because the resistance depends on the material properties as the electron beam is exposed to (e.g., passes through) the storage area. Other changes in material properties, band structure, and crystallography may also affect the resistance.

Figure 4:
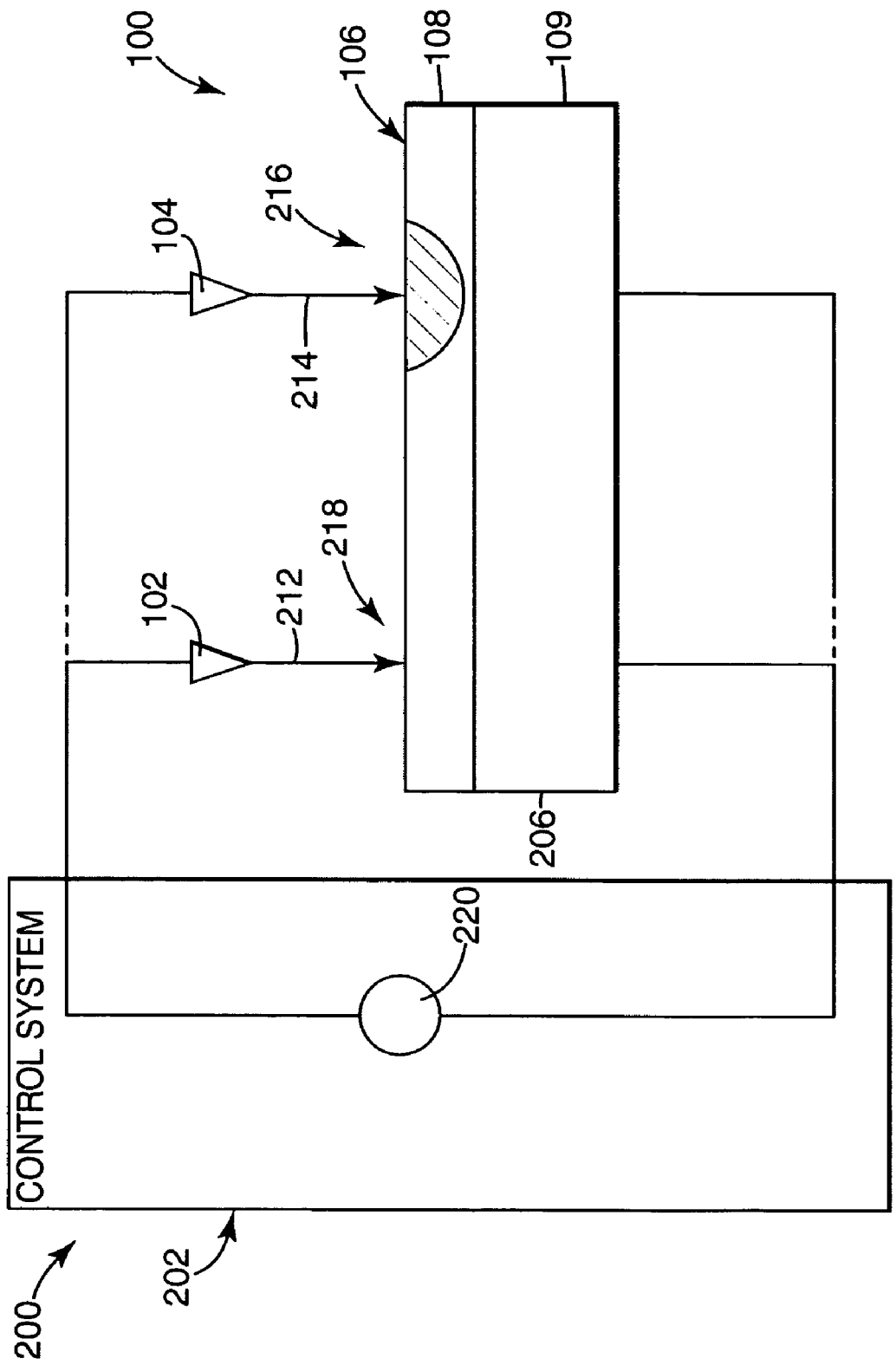
FIG. 4 is a diagram illustrating one exemplary embodiment of a storage system according to the present invention including electron emitters writing to storage areas in a storage device.
Figure 5:
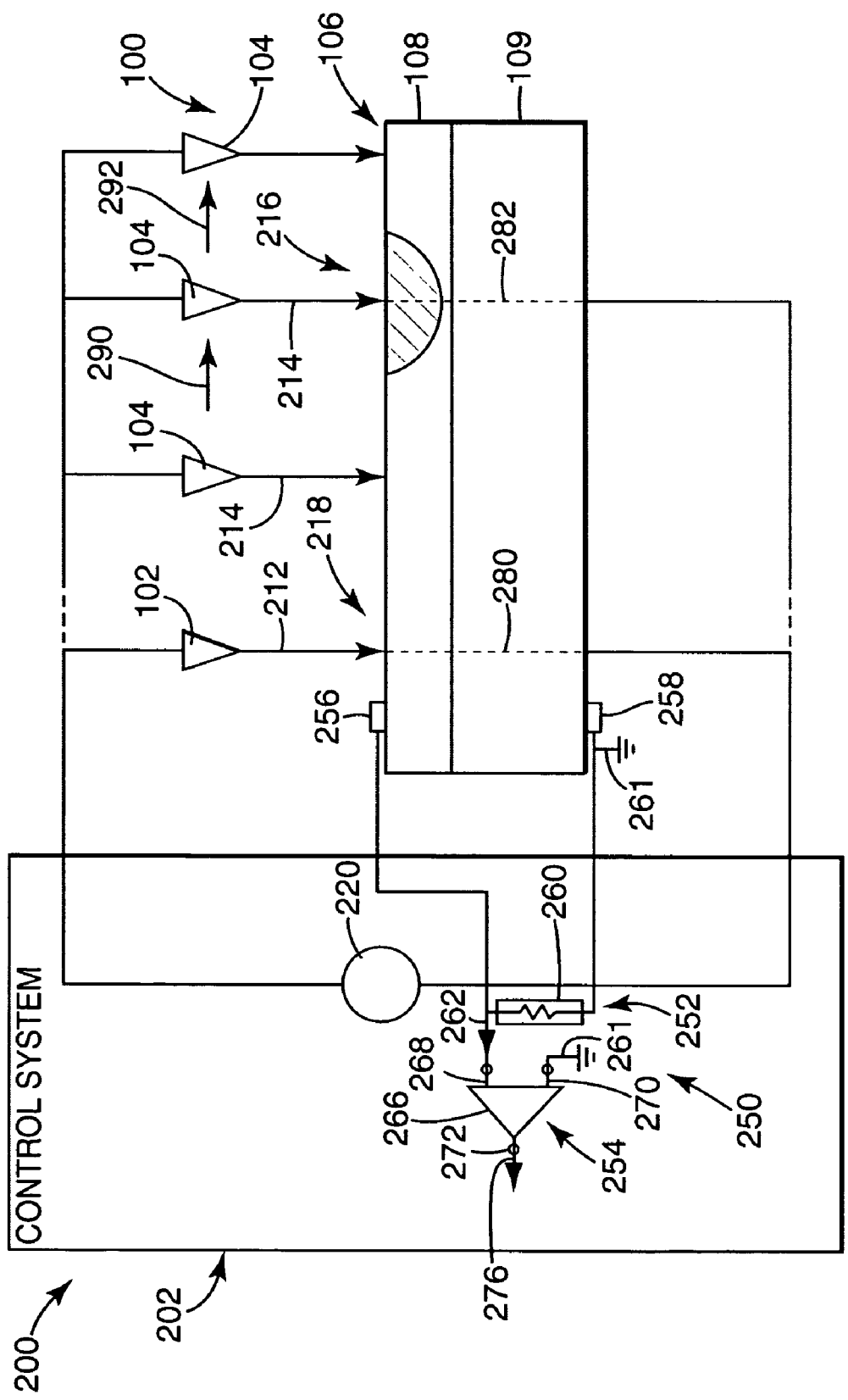
FIG. 5 is a diagram illustrating one exemplary embodiment of a storage system according to the present invention including reading from storage areas of a storage medium using a resistance measurement system.

FIG. 4 and FIG. 5 are diagrams illustrating one exemplary embodiment of a storage system 200 employing a storage device according to the present invention. The storage system 200 includes control system 202 and storage device 100. For ease of discussion, only electron emitters 102, 104 and storage medium 106 of storage device 100 are illustrated. Control system 202 or portions of control system 202 can be located on the same semiconductor component and be part of storage device 100.

FIG. 4 illustrates one exemplary embodiment of writing information to storage device 100. Storage medium 106 includes information layer 108 and semiconductor layer 109. Information layer 108 is made of a phase change material. In one embodiment, information layer 108 is positioned adjacent semiconductor layer 109 and comprises a thin layer of phase change material that is coated or deposited onto semiconductor layer 109. During a write operation, the structure of a storage area is altered in a way as to vary its material properties.

Semiconductor layer 109 is made of a semiconductor material having material properties to aid in the structure of device 100 and measurement of resistance by the resistance measurement system. In one embodiment, semiconductor layer 109 is made of silicon. In another embodiment, layer 109 is made of metal.

During a write operation, control system 202 temporarily increases the power density of the electron beam current 212, 214 to modify the surface state of storage medium 106 at information layer 108. In one embodiment, control system 202 includes a constant current source 220 for controlling the power density of electron beam 212, 214.

A modified storage area is illustrated at 216 and a storage area that has not been modified is illustrated at 218. Initially, unmodified storage area 218 is in a first or crystalline state. To change the phase change material from a crystalline state to an amorphous state indicated by modified storage area 216, the electron beam 214 power density is increased to a high level and then rapidly decreased. In one embodiment, the properties of the phase change material making up information layer 108 are such that the material properties can be reversibly changed from an amorphous state to a crystalline state by heating and cooling the phase change material at the proper rate. For example, to change modified storage area 216 from the amorphous state to the crystalline state, the power density of electron beam 214 is first increased and then slowly decreased. This process heats the amorphous material and then slowly cools it so that the modified area 216 has time to anneal into its crystalline state.

FIG. 5 is a diagram illustrating one exemplary embodiment of reading information from storage device 100. Reading is accomplished by applying a lower power density electron beam to storage medium 106. During reading, the power density of the electron beam (e.g., 212, 214) is kept low enough such that no writing or altering of the state of storage medium 106 occurs. Resistance measurement system 250 detects resistance as an emitter (e.g., electron emitter 102, 104) scans an electron beam across the surface of storage medium 106 to determine whether a storage area is in the first state or the second state. Resistance measurement system 250 uses an electron beam current produced as a result of scanning the electron beam, for detecting resistance.

Resistance measurement circuit 250 includes a resistive divider 252 and an amplifier system 254. Resistive divider 252 includes an amplifier 254 coupled across first ohmic contact 256 and second ohmic contact 258. At ohmic contact 258, storage medium 106 is coupled to a reference potential 261 (e.g., ground potential). Resistive divider 252 provides an output voltage signal 262 representative of the detected resistance through storage medium 106.

Amplifier system 254 includes a voltage amplifier 266 having a first terminal 268, a second terminal 270, and an output terminal 272. Voltage amplifier 266 converts an input voltage signal to an output voltage signal. In particular, resistive divider output signal 262 is provided to first terminal 268. Second terminal 270 is tied to a reference potential. Amplifier system 254 provides a voltage output signal 276 corresponding to the current resistive divider output signal 262, and corresponding to the detected resistance representative of whether storage medium 106 is in a first state or a second state.

During a read operation, a low powered electron beam is applied to storage medium 106 via electron emitter (e.g., electron emitter 102,104) defining a first electron current signal path 280 and a second electron current signal path 282. In one exemplary embodiment, information layer 108 is made of phase change material and semiconductor layer 109 is made of silicon. Storage area 218 is in an unmodified state and storage area 216 is in a modified state. As such, storage area 218 is in a crystalline state and modified storage area 216 is in an amorphous state. As electron emitter 102 scans an electron beam across the storage medium 106 at storage area 218, a relatively uniform output signal 276 is received representative of the crystalline state of storage area 218.

In one embodiment, an amorphous state has a higher resistance than a crystalline state. As such, as electron emitter 104 scans an electron beam 214 across storage medium 106, which is in a crystalline state, a relatively uniform output voltage signal is provided at 276. As electron emitter 104 is scanned across storage area 216, indicated at 290, a signal path 282 is established through the modified storage area 216, which is in an amorphous state. Since a higher resistance is detected through an amorphous area than through a crystalline area, the higher resistance is detected by resistance measurement system 250 and a corresponding change in output signal 276 is detected. As electron emitter 104 moves past the modified storage area 216, indicated at 292, output signal 276 returns to a substantially uniform level. As such, control system 202 has detected information stored at storage area 216.

FIGS. 6–9 illustrate exemplary embodiments of ways for an electron current to pass through a storage area (i.e., drain to ground) for measurement by a resistance measurement system in order to determine whether the storage area is in an unmodified or modified state.

Figure 6:
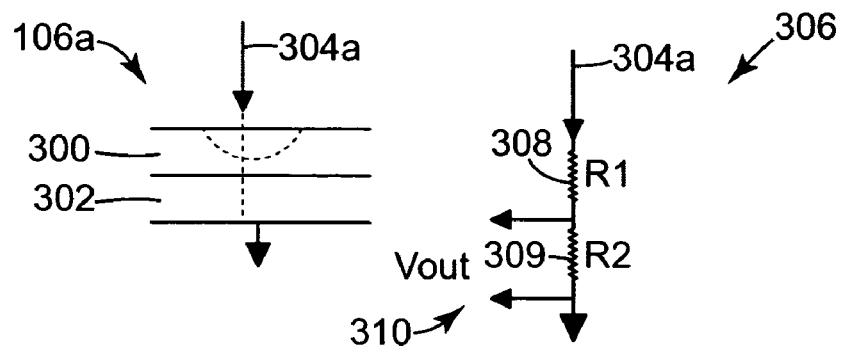
FIG. 6 is a diagram illustrating an exemplary embodiment of an electron current passing through a storage medium in a storage device according to the present invention.

In FIG. 6, storage medium 106a includes phase change layer 300 and silicon layer 302. The electron beam current that passes through the phase change layer 300 and silicon layer 302 is indicated at 304a. A representative circuit diagram is indicated at 306. Resistance R1 308 is the equivalent resistance of the phase change layer 300 and resistance R2 309 is the equivalent resistance of the silicon layer 302. The value of resistance R1 changes, depending on the state of phase change layer 300. If the electron beam current 304a passes through phase change layer 300 in an amorphous state, the resistance R1 is higher than if the electron beam current 304a passes through phase change layer 300 in a crystalline state. As indicated at 310, a corresponding output signal $V_{out}$ is representative of the value of resistance R1 and the state of phase change layer 300.

Figure 7:
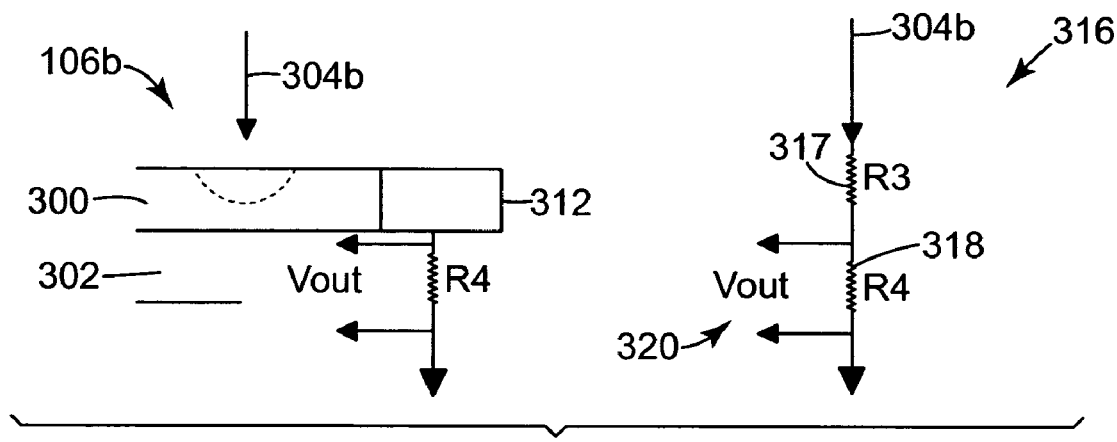
FIG. 7 is a diagram illustrating another exemplary embodiment of an electron current passing through a storage medium in a storage device according to the present invention.

FIG. 7 illustrates another exemplary embodiment for an electron current path to ground. In this embodiment, storage medium 106b includes a metal contact 312. The electron beam current 304b passes through and along the phase change layer 300 to metal contact 312, and through an external resistor R4. External resistor R4 is constant. In the representative circuit 316, the resistance of phase change layer 300, R3 317, changes with a change in the state of phase change layer 300. This results in an output $V_{out}$, indicated at 320, which corresponds to the state (i.e., or resistance value R3) of phase change layer 300.

Figure 8:
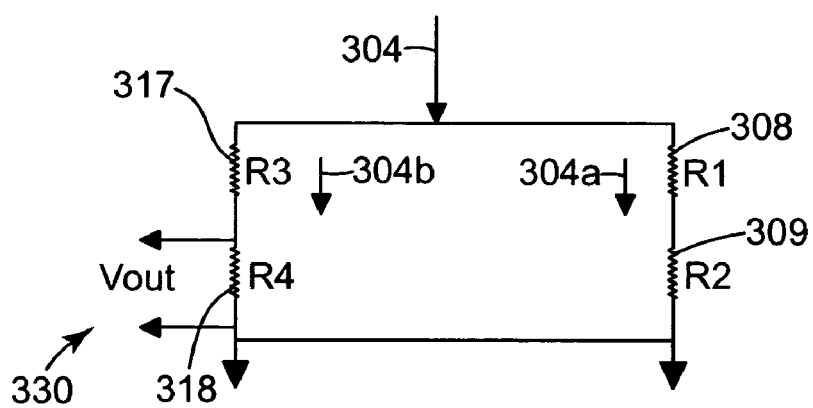
FIG. 8 is a diagram illustrating another exemplary embodiment of an electron current passing through a storage medium in a storage device according to the present invention.

FIG. 8 is a combination of the embodiment illustrated in FIG. 6 and FIG. 7. As such, the value of resistance R1 and resistance R3 are different depending on the state of phase change layer 300. The corresponding voltage $V_{out}$, indicated at 330, depends upon the resistance values R1 308 and R3 317 and corresponds to the state of phase change layer 300.

Figure 9:
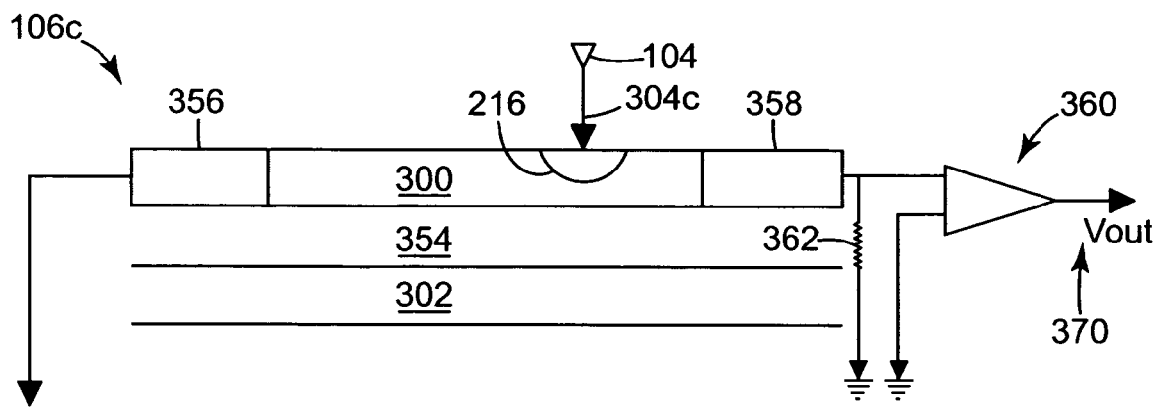
FIG. 9 is a diagram illustrating one exemplary embodiment of an electron current passing through a storage medium in a storage device according to the present invention.

FIG. 9 is a diagram illustrating another exemplary embodiment of storage medium 106, indicated at 106c. Storage medium 106c includes phase change layer 300 and silicon layer 302 separated by an insulator layer 354. In one embodiment, insulator layer 354 is a silicon dioxide insulator. Metal contacts are located at 356 and 358. Voltage amplifier 360 includes an input resistance or external resistance, illustrated at 362. Similar to the illustration of FIG. 7, electron beam current 304c passes along the phase change layer 300 to metal contact 358 and through external resistor 362, providing a corresponding output voltage $V_{out}$ 370 representative of the state of phase change layer 300.

Figure 10:
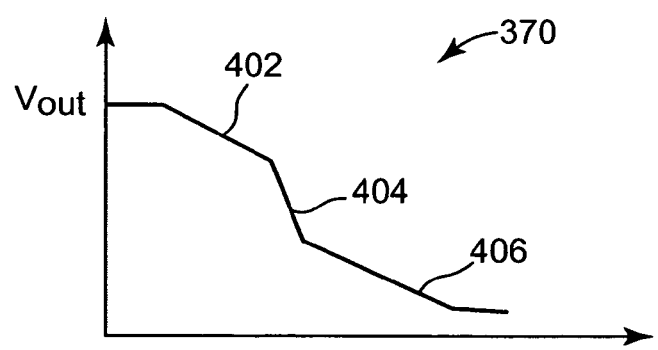
FIG. 10 is a graph illustrating one exemplary embodiment of an output signal from a resistance measurement system used in a storage system according to the present invention.

FIG. 10 is a graph illustrating one exemplary embodiment of $V_{out}$ 370 as electron emitter 104 is scanned from right to left across modified storage area 216 (illustrated in FIG. 9). The slope of the waveform representative of the output voltage $V_{out}$ 370 is proportional to the value of the resistivity. In particular, at 402, electron emitter 104 scans an electron beam over an unmodified storage area, providing a first output voltage waveform. At 404, electron emitter 104 scans across modified storage area 216, providing a second output voltage waveform. The output signal waveform increases in slope representing an increase in resistivity. At 406, the output voltage is illustrated after electron emitter 104 has passed over the modified storage area 216, resulting in a reduced slope or resistivity (a third output voltage waveform).

The atomic resolution storage device 100 according to the present invention includes a resistance measurement system for detecting a resistance of the storage medium at the storage location using the electron beam current for determining the state of the storage medium at the storage area or location. As such, the atomic resolution storage device 100 does not require the same level of phase change to silicon heterojunction for device operation as previous designs.

What is claimed is:

1. A storage device comprising:
   an electron emitter;
   a storage medium comprising an information layer having at least a first state and a second state for storing information; and
   a resistance measurement system coupled to the storage medium for reading the information stored at the information layer by measuring resistance to determine a state of a storage area on the information layer.

2. The storage device of claim 1, further comprising a micromover to change a relative position between the electron emitter and the storage medium.

3. The storage device of claim 1, wherein a read signal path is defined between the electron emitter and a storage medium reference, and the resistance measurement system detects a first resistance by measuring the resistance through the storage medium including the storage area along the read signal path.

4. The storage device of claim 3, wherein the resistance measurement system includes a voltage divider that utilizes the first resistance and a second, known resistance.

5. The storage device of claim 3, wherein the first resistance has a value representative of whether the read signal path passes through a portion of the information layer that is in the first state or the second state.

6. The storage device of claim 3, wherein the resistance measurement system receives a current output signal representative of whether the read signal path passes through a portion of the information layer in the first state or the second state.

7. The storage device of claim 6, wherein the resistance measurement system further comprises a transimpedance amplifier for converting the current output signal to a voltage signal representative of the first state or the second state.

8. A storage device comprising:
   an electron emitter capable of generating an electron beam current;

a storage medium, comprising an information layer and a semiconductor layer, the information layer having a first state and a second state for storing information; and a resistance measurement system coupled to the storage medium, wherein when the storage medium is exposed to the electron beam current along a signal path, the resistance measurement system detects a resistance value representative of whether the information layer is in the first state or the second state along the signal path.

9. The storage device of claim 8, wherein the information layer is made of a phase change material.

10. The storage device of claim 9, wherein the phase change material is a Ge—Sb—Te ternary alloy.

11. The storage device of claim 8, wherein the first state is a crystalline state and the second state is an amorphous state.

12. The storage device of claim 8, wherein the semiconductor layer comprises silicon.

13. The storage device of claim 8, wherein the semiconductor layer comprises metal.

14. A storage system comprising:

a nonvolatile storage device comprising an electron emitter that generates an electron beam current, a storage medium in close proximity to the electron emitter, wherein the storage medium comprises an information layer made of a phase change material and a semiconductor layer, and a resistance measurement system coupled to the storage medium, wherein as the storage medium is exposed to the electron beam current along a signal path, the resistance measurement system detects a resistance value representative of whether the information layer is in a first state or a second state; and a control system in communication with the resistance measurement system for reading data at the information layer.

15. The storage system of claim 14, the storage system having a read mode, where in the read mode the control system controls the magnitude of the power density of the electron beam current generated from the electron emitter that provides a resistance detection signal representative of the information stored on the storage medium.

16. The storage system of claim 15, the storage system having a write mode, where in the write mode the control system operates to control the magnitude of the power density of the electron beam current generated from the electron emitter to change a storage location on the storage medium between the first state and the second state to store information at the storage location.

17. The storage system of claim 16, wherein the read mode the magnitude of the power density of the electron beam current is less than the magnitude of the power density of the electron beam current in the write mode.

18. The storage system of claim 14, wherein at least a portion of the control system is located on the same semiconductor chip as the nonvolatile storage device.

19. A storage system comprising:

a control system; and an array of storage devices in communication with the storage system, each storage device including an array of electron emitters fabricated by semiconductor microfabrication techniques capable of generating electron beams, a storage medium having medium partitions, and a plurality of micromovers wherein each micromover is operable to move one or more media partitions relative to one or more electron emitters for reading and writing data at the media, and a resistance measurement system positioned at each media partition for reading resistance values to determine data stored at the media partition.

20. The system of claim 19, wherein at least a portion of the control system and the array of storage devices are located on the same semiconductor chip.

21. The system of claim 19, wherein the control system receives an output signal from each resistance measurement system representative of data stored at each media partition.

* * * * *

UNITED STATES PATENT AND TRADEMARK OFFICE
CERTIFICATE OF CORRECTION

PATENT NO. : 7,085,151 B2  Page 1 of 1
APPLICATION NO. : 10/756549
DATED : August 1, 2006
INVENTOR(S) : Gary Ray Ashton et al.

It is certified that error appears in the above-identified patent and that said Letters Patent is hereby corrected as shown below:

On the title page, item (75), in "Inventors", in column 1, line 2, delete "Bicknell" and insert -- Bicknell-Tassius --, therefor.

In column 10, line 11, in Claim 17, delete "wherein" and insert -- where in --, therefor.

Signed and Sealed this

Twenty-third Day of June, 2009

JOHN DOLL
*Acting Director of the United States Patent and Trademark Office*